Jan. 4, 1938.  S. K. WOLFF  2,104,534
CAMP GRILL
Filed July 20, 1937
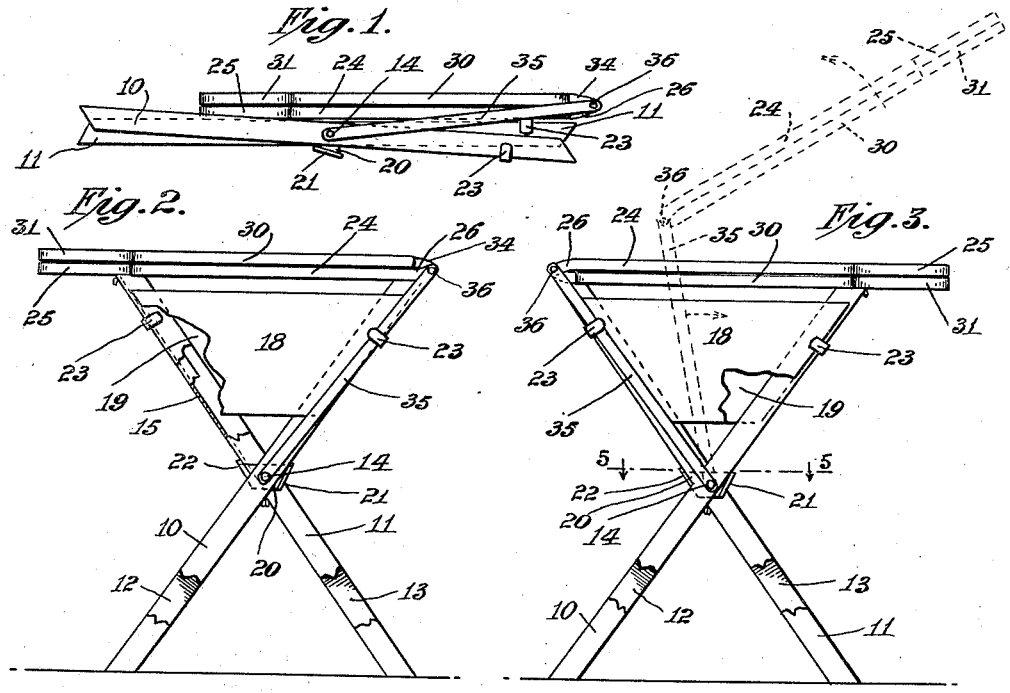
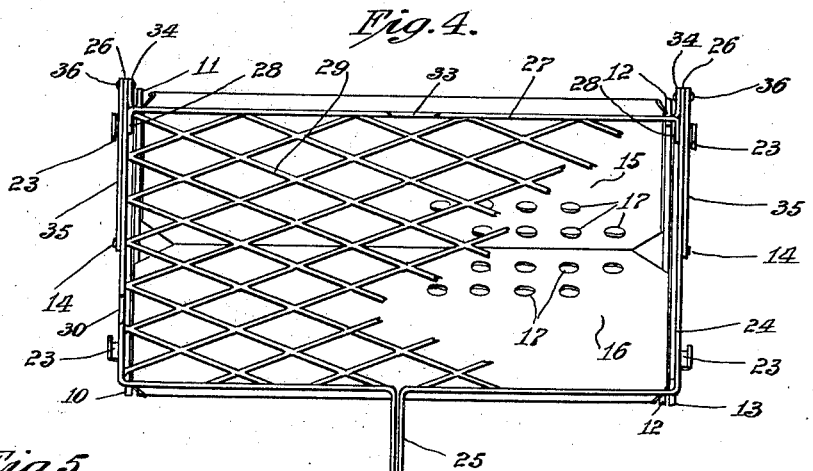
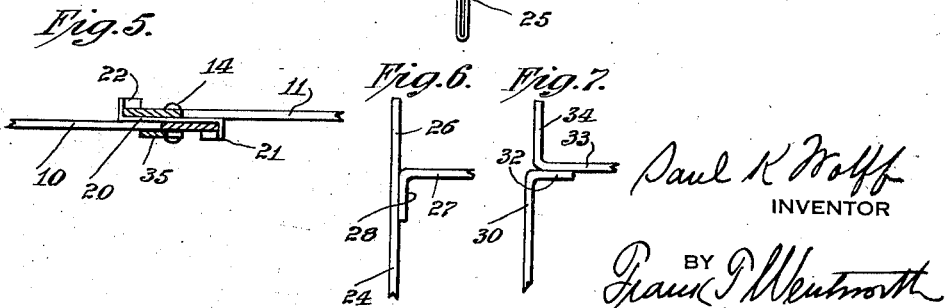
Paul K. Wolff
INVENTOR
BY Frank P. Wentworth
ATTORNEY.

Patented Jan. 4, 1938

2,104,534

UNITED STATES PATENT OFFICE 2,104,534

CAMP GRILL

Saul K. Wolff, Long Beach, N. Y.

Application July 20, 1937, Serial No. 154,537

8 Claims. (Cl. 126—29)

The invention relates to camp grills, and more particularly to a structure embodying therein collapsible and extensible members forming a firebox having suitable legs therefor, and a grid carried by supports so formed as to not only permit the collapsing of the grid in relation to the members of the firebox, but the turning or reversal of the grid to facilitate the use of the structure.

At the present time there is a growing tendency toward automobile excursions, during which meals are prepared in the out-of-doors, either in tourists' camps or in public parks, many of which latter are provided with permanent fireplaces and others of which are not so equipped. Consequently, when going on daily picnics or upon extended tours, when meals are to be prepared by the picnickers or the tourists, it is desirable to be equipped with a grill which will occupy, when not in use, small space; in which the main parts of the structure are permanently united so as to preclude misplacement of these parts, and to have a structure which may be conveniently handled and which may be effectively used for cooking purposes.

When picnicking or camping, most of the food used is broiled or boiled, so that it is desirable that the construction of stove be such as to permit the broiling of various kinds of meats such as sausages, steaks, chops, fish, etc.

With the above conditions in mind, I have provided a camp grill, the various parts of which may be collapsed in relation to each other, which structure embodies therein two hinged members embodying therein plates which, when the structure is opened, form a firebox provided with suitable draft openings toward the bottom thereof, and so spaced from the ground as to insure a proper draft for the maintenance of a wood or charcoal fire. These members have associated and permanently connected therewith, two hinged open grids so connected with the legs of the structure as to permit the reversal of the grids and insure a firm support therefor, irrespective of which side of the grid is exposed to the fire within the firebox. This supporting means for the grid is such as to avoid any possibility of the displacement of the grid in relation to the firebox; permits the free turning of the grid without possibility of the escape of the food therefrom, and yet permits the grid, when the structure is collapsed, to be brought to one side of the two members forming the firebox and be of substantially the same dimensions as these parts, so that the whole structure may be collapsed in a compact form.

The construction of the grid and the parts co-operating therewith is such that the top of the firebox structure supports the grid in position above the firebox while it is in use, means being provided to limit the movements of the grid to insure its proper location when preparing the grill for use and when turning the grid.

The invention consists primarily in a camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, an arm pivotally connected with each pair of legs, and a pair of grids pivotally connected with each other and with the free end of said arms, whereby as said arms are shifted from one side to the other of said firebox, the position of said grids will be reversed; and in such other novel features of construction and combination of parts as are hereinafter set forth and described, and more particularly pointed out in the claims hereto appended.

Referring to the drawing,

Fig. 1 is a side view of a camp grill embodying the invention with the parts in the collapsed position;

Fig. 2 is a view of one end thereof, partly broken away, with the legs extended to form the firebox;

Fig. 3 is a similar view with the grid reversed;

Fig. 4 is a plan view of Fig. 2;

Fig. 5 is a detail sectional view showing the leg and grid supporting arm structure at one end of the grill; and Figs. 6 and 7 are detail views of the structure at one corner of each of the grid members.

Like numerals refer to like parts throughout the several views.

In the embodiment of the invention shown in the drawing, the grill includes therein a pair of legs 10 and 11 at one end thereof, and a corresponding pair of legs 12 and 13 at the other end thereof. The legs of each pair are pivotally connected intermediate the ends thereof, as by a pivot 14, so that the legs may be folded together, as shown in Fig. 1, or extended, as shown in the other views of the drawing, so that one end of the legs of each pair is adapted to support the structure from the ground sufficiently to afford ample draft space for a charcoal or wood fire built within a firebox formed by plates 15 and 16 carried by the legs 10 and 12 and by the legs 11 and 13 respectively.

The plates 15 and 16 extend from adjacent the top of the legs carrying same to a point adjacent the pivotal support 14 of those legs and the legs of the other pair. The side plates 15 and 16 have draft openings 17 toward the bottom of each plate.

The ends of the firebox are partially closed by trapezium shaped plates 18 and 19, the side edges of these plates conforming to the angle of the opposite legs of a pair, so that draft spaces toward the bottom at opposite ends of the firebox are provided and no nicety in the dimensions of these plates is required.

Mounted upon each pivot 14 is a plate 20 having angular stop flanges 21 and 22 at the opposite ends thereof, one of these flanges being adapted to engage and arrest turning movement of one of the legs of each pair, and the other flange having a similar action as to the other leg. In this manner, the opening movement of the legs is controlled and limited.

Each leg of each pair, adjacent the top thereof, is provided with an angular clip 23 positioned at the outer side of, and parallel with, the face of the leg. These clips not only serve to retain the end plates 18 and 19, positioned between same and the face of the legs, in position, but also as stops co-operating with the arms supporting the grids to ensure the proper support of the grids from the top of the legs, and control the turning movement of the grid in a manner to be hereinafter described.

The grid proper consists of two members, one of which consists of a frame 24 having a closed loop 25 centrally of one side bar thereof, and having straight end bars, the ends 26 of which project beyond a side bar 27, having end ears 28 by means of which this side bar is secured to the end bars of the frame. Said ears 28 extend inwardly of the frame of the grid.

An ordinary expanded sheet metal grill 29 is contained within the frame, although the construction of this grill is immaterial to the invention.

The other grid 30 is of substantially the same construction as heretofore described, having a handle portion 31 corresponding in position with the handle portion 25 to permit the grids to be held together while they are being reversed. There is this difference in construction between the two grids, however. While in the grid 24 the ends 26 of the frame project beyond the side bar 27, and the ears 28 of said bar extend inwardly of the grid, in the grid 30 the ends of the end bars are turned toward each other, as shown at 32, and a side bar 33 is secured to these inturned ends and has ears 34 projecting outwardly of the frame parallel with the end bars of that grid and with the projecting ends 26 of the end bar of the other grid, so as to have a parallel lapping relation with the projecting ends 26. The ends 26 and the ears 34 converge toward each other slightly so as to secure an overlapping abutting relation toward the ends thereof. The two grids are pivotally connected by means of the extensions 26 of the side bars of one grid and the ears 34 of the other grid.

The pivotal connection of the two grids permits them to be opened and closed when placing food therein or removing it therefrom.

Pivotally supported adjacent each pair of legs and held in position in relation to said legs by the pivot 14 are swing arms 35. These arms respectively are positioned on the outside of the legs of each pair, so that when the grid is positioned with the hinge connection between same at one side of the firebox, the arms will engage one of the clips 23, and when the grid is turned to bring the hinge connection on the opposite side thereof, said arms will engage the clips 23 on the other legs of each pair.

The arms 35, in order to permit a free turning of the grids thereon, are of a length greater than the adjacent leg portions, to permit the grids to rest upon, and be supported from, the tops of the legs while the grill is in use.

The clips 23 limit the turning movement of the arms 35 in either direction, thus avoiding all likelihood of the escape of the grids from the hand of the user when said grids are being reversed.

The projecting ends 26, the ears 34 and the free end of the arms 35 at opposite sides of the grid are connected by a single pivot 36.

The frame of the grid 30 carries a grillwork corresponding with the grillwork 29 of the grid 24.

Preferably, the side bars 27 and 33 are secured to the end bars of the grid frame, and the grill is secured in each frame, by welding.

The clips 23 are also secured to the legs by welding, although as stated, the plate 20 is mounted upon the pivot 14 so as to limit the movement of the legs in relation to each other when opening the grill.

The opposite ends of each leg are cut at an angle which will bring said ends upon substantially horizontal planes when the grill is opened.

The manner of use and the mode of operation of the herein described camp grill is substantially as follows:—

When the grill is not in use, the legs of each pair are folded together about the pivot 14, and the arms 35 are sprung outwardly so as to pass the clips 23 in order that the grids may be folded against the outside of the legs. The position of the various parts, when collapsed, is shown in Fig. 1 of the drawing.

The end plates 18 and 19 must be removed before the legs are folded together, and for storage and transportation purposes these end plates are placed between the grids 24 and 30.

When so folded, the thickness of the collapsed structure will be less than three inches, so that it may be readily packed in a thin box or with other materials without occupying any great amount of space.

When it is desired to use the grill, the legs of each pair are turned about the pivot 14 and the end plates 18 and 19 are then dropped between the clips 23 upon each leg, and the leg. The entire grid structure is then moved endwise until one of the arms 35 is free to pass a clip 23 on one side of the firebox, and then moved in the other direction until the other arm is permitted to pass the clip 23 at the opposite ends of the firebox, these arms, when the grid is released, automatically engaging the clips 23, the grid hanging from the arms at one side of the firebox.

A fire may then be built in the firebox, and when it is well started, the two grids are swung about the pivots 36 connecting them with the arms 35 and allowed to drop into engaging relation with the tops of the legs of both pairs. The uppermost grid may then be raised and the food placed upon the grillwork of the lower grid and the upper grid returned to its closed position. The frames of each grid are approximately onehalf inch in depth and the grillwork is positioned at, or slightly above, the outer edge of the grid. In this manner, ample space is afforded between the two grids, and the firm holding of food therebetween is assured.

When one side of the food has been exposed to the hot embers for a sufficient time to properly sear the surface thereof, the grids may be reversed by merely lifting them by means of the handles 25 and 31, meanwhile drawing the arms 35 from adjacent one leg to adjacent the other leg while permitting the grid to turn about the pivots 36, as shown in dotted lines in Fig. 3, thus exposing the other side of the food to the embers in the firebox.

The movement of the arms 35 is stopped by their engagement with the clips 23 carried by the opposite legs, and when the grid is allowed to drop its frame engages the tops of the various legs. The reversal of the grids may be accomplished by a very rapid movement, and the direction of application of the weight of the grids and of the food contained therebetween will result in a positive movement of the arms 35 after they have once passed the vertical center of their pivotal movement. While the grill is in use, the grids are always firmly supported from the tops of the legs, and any accidental movement thereof or of the arms 35 is impossible.

In securing the grillwork to the grid frames, edge portions thereof are bent at an angle and welded to the inside of the bars of the frame. The top and bottom edges of the end plates 18 and 19 are turned upon themselves for the purpose of avoiding sharp edges which might lacerate the hand of a user when placing these plates in, or removing them from, the pockets afforded by the clips 23 at the ends of the firebox.

It will be noted that the clips 23 have the twofold function of limiting the pivotal movement of the arms 35 to ensure a proper positioning of the grids in relation to the tops of the legs, and to support the end plates 18 and 19 in completing the formation of the firebox.

After the grill has been used and it is desired to stow same away, it is merely necessary to lift the grids until the arms 35 are spaced well from the clips 23 with which they are co-operating at the time, and to impart sidewise movement to the grids and to these arms until first one arm and then the other has been moved past said clips. Whereupon, the legs may be closed together and the arms moved, and the grids folded against the sides of the closed legs. Before the legs can be closed, it is necessary to move the end plates 18 and 19, these plates being inserted between the two grids for safe keeping.

The stop plates 20 and the clips 23 are so proportioned that even in the event of the warping of the structure from heat there will still be ample clearance for the free movement of parts.

All parts of the structure are made of iron, the legs and grid frames being made of strap iron or steel, and the grillwork preferably being made of expanded sheet metal, a product readily obtainable upon the open market.

It is not my intention to limit the invention to the precise details of construction shown in the accompanying drawing, it being obvious that such may be varied without departing from the spirit and scope of the invention.

Having described the invention, what I claim as new and desire to have protected by Letters Patent, is:—

1. A camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, an arm pivotally connected with each pair of legs, and a pair of grids pivotally connected with each other and with the free end of said arms, whereby as said arms are shifted from one side to the other of said firebox, the position of said grids will be reversed.

2. A camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, a plate having angular stop flanges at the opposite ends thereof engageable respectively by the opposite legs of each pair, an arm pivotally connected with each pair of legs, and a pair of grids pivotally connected with each other and with the free end of said arms, whereby as said arms are shifted from one side to the other of said firebox, the position of said grids will be reversed.

3. A camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, an arm pivotally connected with each pair of legs, a pair of grids pivotally connected with each other and with the free end of said arms, whereby as said arms are shifted from one side to the other of said firebox, the position of said grids will be reversed, and an angular clip at the outer side of, and adjacent the top of the leg of each pair and engageable by said arms, whereby engagement of said grids with the tops of said legs is assured.

4. A camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, a swing arm adjacent each pair of legs and pivotally connected therewith by means of the pivot connecting said legs, a pair of grids pivotally connected with each other and with the free end of said arms, whereby as said arms are shifted from one side to the other of said firebox, the position of said grids will be reversed, and an angular clip at the outer side of, and adjacent the top of the leg of each pair and engageable by said arms, whereby engagement of said grids with the tops of said legs is assured.

5. A camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, an arm pivotally connected with each pair of legs, a grid proper consisting of two members, the end bars of the frame of one of which extends beyond a side bar, and the side bar of the other of which is provided with ears parallel with said projecting ends, and means pivotally connecting said projecting ends, said ears and said arms, whereby as said arms are shifted from one side to the other of said firebox, the position of said grid will be reversed.

6. A camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, an arm pivotally connected with each pair of legs, a pair of grids pivotally connected with each other and with the free end of said arms, whereby as said arms are shifted from one side to the other of said firebox, the position of said grids will be reversed, an angular clip at the outer side of, and adjacent the top of the leg of each pair and engageable by said arms, whereby engagement of said grids with the tops of said legs is assured, and trapezium shaped end plates partially closing each end of said firebox and supported by said clips.

7. A camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, an arm pivotally connected with each pair of legs, a grid proper consisting of two members, the end bars of the frame of one of which extends beyond a side bar, and the side bar of the other of which is provided with ears parallel with said projecting ends, means pivotally connecting said projecting ends, said ears and said arms, whereby as said arms are shifted from one side to the other of said firebox, the position of said grid will be reversed, and a handle upon each of said members comprising a closed loop portion integral with the side bar opposite the point of pivotal connection between said members.

8. A camp grill embodying therein two pairs of legs, the legs of each pair being pivotally connected intermediate their ends, side plates carried by the corresponding legs of each pair and extending to adjacent said pivotal connection, whereby when said grill is opened a firebox is formed, a plate having angular stop flanges at the opposite ends thereof engageable respectively by the opposite legs of each pair, a swing arm adjacent each pair of legs and pivotally connected therewith by means of the pivot connecting said legs, a grid proper consisting of two members, the end bars of the frame of one of which extends beyond the side bar, and the side bar of the other of which is provided with ears parallel with said projecting ends, means pivotally connecting said projecting ends, said ears and said arms, whereby as said arms are shifted from one side to the other of said firebox, the position of said grid will be reversed, a handle upon each of said members comprising a closed loop portion integral with the side bar opposite the point of pivotal connection between said members, an angular clip at the outer side of, and adjacent the top of the leg of each pair and engageable by said arms, whereby engagement of said grids with the tops of said legs is assured, and trapezium shaped end plates partially closing each end of said firebox and supported by said clips.

SAUL K. WOLFF.